Nov. 6, 1951        E. E. LIBMAN ET AL        2,574,336
                        WIND RESOLVER
Filed Jan. 8, 1949                           2 SHEETS—SHEET 1

INVENTOR.
Earl E. Libman and
BY    Edward Lohse,
            Edward L. Mueller
                ATTORNEY.

Nov. 6, 1951    E. E. LIBMAN ET AL    2,574,336
WIND RESOLVER
Filed Jan. 8, 1949    2 SHEETS—SHEET 2

INVENTOR.
Earl E. Libman and
BY  Edward Lohse,
Edward L. Mueller
ATTORNEY.

Patented Nov. 6, 1951

2,574,336

UNITED STATES PATENT OFFICE 2,574,336

WIND RESOLVER

Earl E. Libman, Brooklyn, and Edward Lohse, Ridgewood, N. Y., assignors to Control Instrument Company, Inc., New York, N. Y., a corporation of New York Application January 8, 1949, Serial No. 69,914

5 Claims. (Cl. 73—432)

This invention relates to improvements in systems for resolving wind direction into a component along or across an arbitrary line of reference. More particularly, it relates to a system for continuously indicating that component of wind which is across this reference line and for transmitting this information to other devices such as ballistic or navigational computers.

Resolvers and indicators presently in use rely on the measurement of wind velocity and direction, and then upon computers associated with the measuring device for resolving the measured wind velocity and direction into the required components. This method requires that the sensing element be movable and be kept normal to the direction of wind to be resolved, introducing errors due both to difficulty of accurately finding the point of maximum wind pressure and the further difficulty of following a rapidly shifting wind.

An object of this invention is therefore to utilize a fixed sensing element which will respond to and measure only that component of wind incident thereon which is normal to a given or defined plane without the requirement of being specially oriented with respect to the incident wind, and further, whose output is some function of its input but whose sensitivity is not impaired by operation close to its zero or null condition, so that a high degree of accuracy may be maintained throughout the operating range of the instrument.

The above and further objects of the invention will be made apparent from the specification to follow and accompanying drawings, it being distinctly understood that the specification and drawings are intended to illustrate rather than to limit and define the scope of the invention, reference being made to the appended claims for this purpose.

Figure 1:
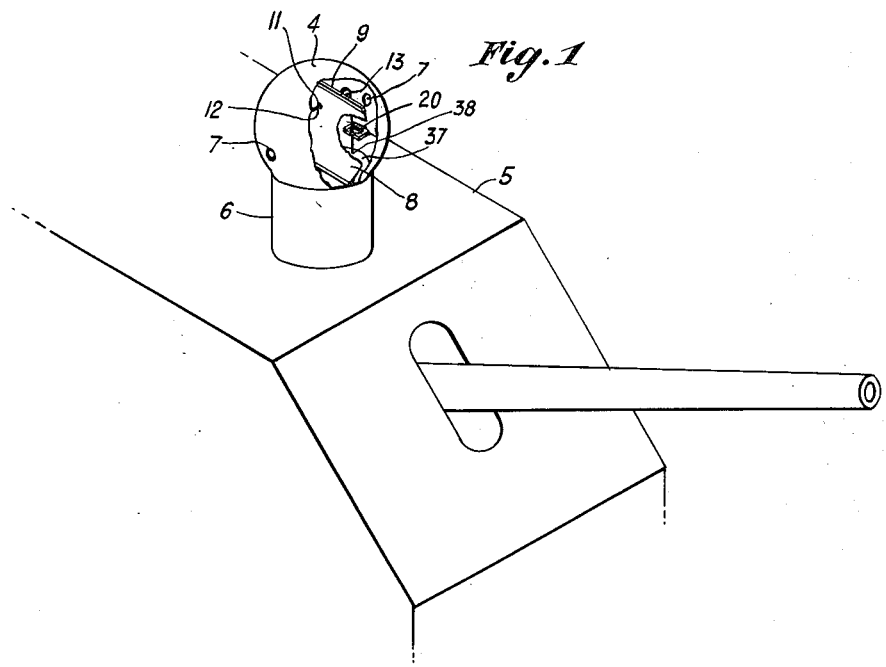
Fig. 1 is an isometric view of the sensing element housing with one surface partly broken away to show the location of the sensing element.

The embodiment shown in the various drawings illustrates the invention as applied to the determination of crosswind as it is required to be known for the operation of guns. It is to be noted, however, that the invention is not restricted to crosswind determinations for gunnery alone, but has utility wherever crosswind is required to be known and enters into computation, such as in the navigation of ships and aircraft, etc. The pick-up housing 4 is mounted on the turret 5 by means of support 6 and bears two diametrically opposed openings 7. Although the housing 4 is illustrated as being spherical, deviations from such spherical form may be required to minimize turbulence and wind velocity errors introduced thereby.

The straight line joining the openings 7 is so oriented as to be transverse to the firing axis of the gun upon which housing 4 is mounted, and will therefore be parallel to that component of wind which is across the gun axis and will admit this component of wind to the interior of said housing.

The sensing element therein contained comprises a diaphragm 8 which is anchored to the housing 4 at its periphery and at its opposed edges 9 and 10, and is constructed of a light resilient material so that it will flex under pressure. This diaphragm divides the housing into two separate parts. Fastened to the center of the diaphragm, at 11, so as to be movable therewith, is a wire generally indicated at 12 which is of high magnetic permeability, and which passes over the pulleys 13 and 14 and is terminated by being fastened to the pivoted bar 15 at the points 16 and 17 by means such as wing nuts 18 and 19. Said means is utilized to tension and adjust the portions 12a and 12b of the wire extending, respectively, between the points 11 and 16 and the points 11 and 17.

The portions 12a and 12b between the pulleys 13 and 14 and the bar 15 pass through the air gaps of the C-shaped magnetic structures of the pairs of coils 20, 21 and 22, 23, one pair assigned to each portion of the wire.

Figure 3:
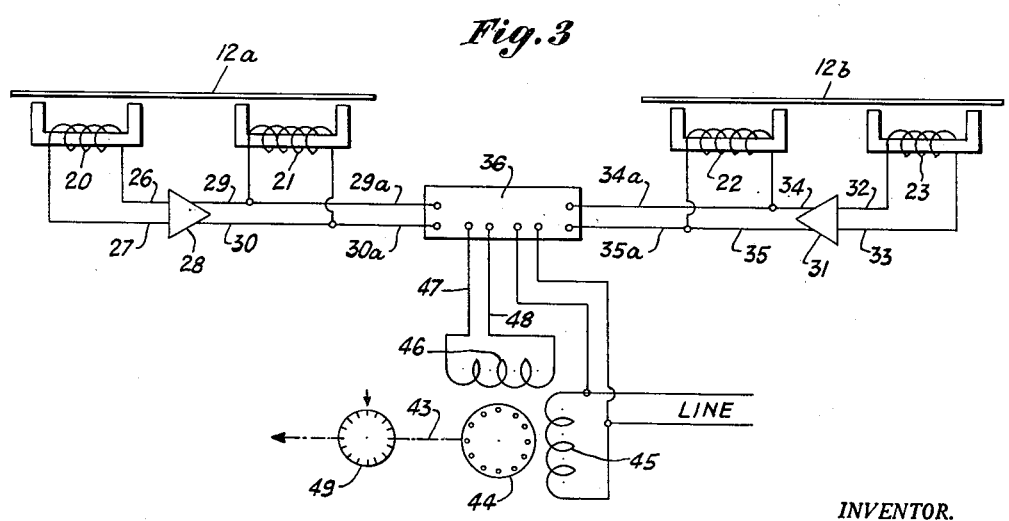
Fig. 3 is a schematic view showing the various components of the device and their mode of interconnection.
Figure 2:
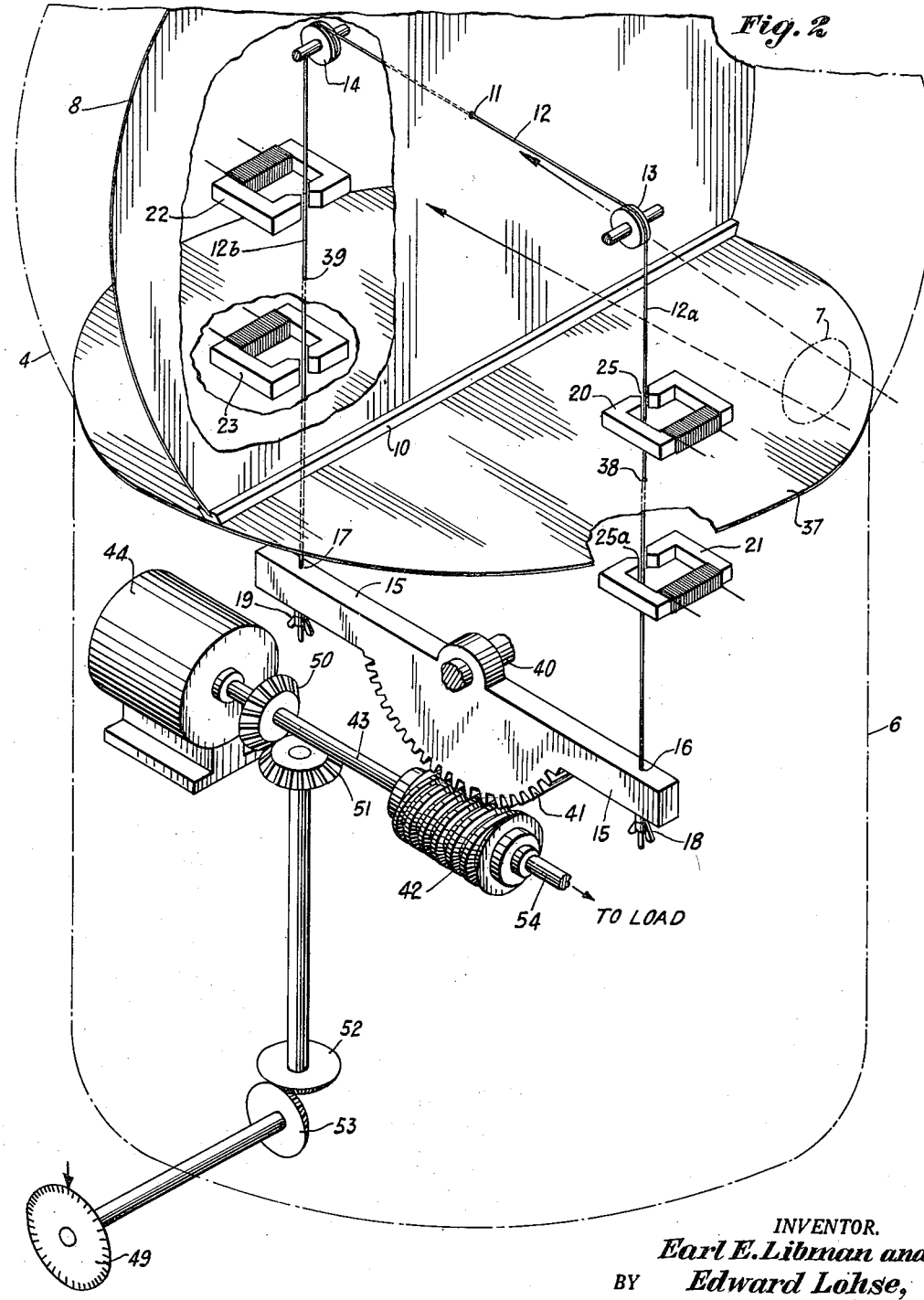
Fig. 2 is an isometric view showing the relative position of the various components comprising the mechanism.

Coils 20 and 21, associated with the portion 12a, are interconnected by way of the amplifier 28, coil 20 being the input thereto and 21 the output therefrom. Motion of the wire passing through the air gap 25 of the magnetic structure of coil 20 changes the reluctance thereof so that any movement of the wire will vary the inductance of the coil 20 and thus change the voltage drop across said coil. This voltage across leads 26 and 27 is amplified in the amplifier 28 and connected to coil 21 by the leads 29 and 30. The now amplified alternating voltage causes an alternating magnetic field across the air gap 25a of the magnetic structure of coil 21 which, in turn, causes the wire portion 12a passing therethrough to vibrate. Since this vibration is being picked up by coil 20, a sustained oscillation will build up and continue at a frequency determined by the tension in the wire. Oscillations will be started by any transient such as the turning on of the power which makes the device operative and, in effect, the amplifier 28 is turned into an oscillator by having its output in coil 21 coupled to its input in coil 20, the common coupling element being the wire 12a, as shown by Fig. 3.

In a similar manner the coils 22 and 23 are interconnected by way of the amplifier 31 and leads 32, 33, 34 and 35, so that the portions 12a and 12b are set in vibratory motion and control the input and the output of the amplifiers 28 and 29.

The amplifier outputs, on leads 29a, 30a and leads 34a and 35a may now be compared, not in magnitude, but in frequency, in the comparison amplifier 36 and converted into a power output of line frequency whose magnitude is a function of the frequency difference of its inputs and whose phase is determined by the relative magnitude of the inputs. When both wire portions 12a and 12b are under the same tension the frequency difference will be zero and no output will result; when either portion is under greater tension than the other, the frequency of vibration of that portion and of the coacting coils and amplifier will be higher, and the amplifier 36 will then have an output uniquely determined in phase and magnitude.

A plate of relatively high permeability material 37 having two openings 38 and 39 through which the portions 12a and 12b pass, is placed between the coils which excite the wire and the coils which pick up the vibrations thereof so that the feedback between the two is restricted to mechanical feedback due to the wire alone and avoids any possibility of there being magnetic coupling between the coils.

The bar 15 to which the wire is fastened at 16 and 17 is pivoted at 40, and carries an arcuate gear-like sector 41 which is coupled by the worm gear 42 and shaft 43 to the two-phase motor 44. One phase winding 45 in said motor is connected to the line and the other phase winding 46 is connected by means of the leads 47 and 48 to the output of the comparison amplifier 36.

In the event that the portions 12a and 12b of the wire 12, as divided by the diaphragm 8, are at different tensions, their frequency of vibration will differ, and this difference converted to a voltage will be amplified and applied to the winding 46 of the motor 44 causing it to run and, by way of gears 41 and 42, to tilt the bar 15 to equalize the tension in the wires. At zero difference frequency, the motor will stand idle with one phase unexcited; at any difference frequency, it will run, and in the direction required to minimize the difference.

The transverse openings 7 in the head 4 being, as described, oriented so that their line of centers is transverse to the gun axis, only that component of wind which is across the gun will be admitted thereto. The diaphragm 8 is oriented within the head 4 at right angles to said center line so that the wind component will increase the pressure within the head and deflect the diaphragm 8. This displacement will cause the tensioning of one portion of the wire 12 and the relaxation of tension in the other portion so that the frequencies at which the two parts can be made to vibrate will differ; and this difference frequency, by the means hereinbefore outlined, will be corrected by the motion of the bar 15 equalizing the tension in the separated portions of the wire 12.

The displacement of the bar 15 from its initial position, in which, with no wind pressure on the diaphragm 8, the tension in both portions of the wire 12 is equal, to some new position to equalize the tension due to wind pressure on the diaphragm 8, may be calibrated directly in terms of crosswind velocity and may be made to drive an indicator 49 such as is shown geared to the motor shaft 43 by the gears 50, 51, 52 and 53.

The extension 54 of shaft 43 may be coupled directly to a computer so that the component of crosswind velocity may be introduced thereinto directly as well as read from the dial 49.

What is claimed is:

1. In an instrument responsive to the magnitude of the component of wind velocity at right angles to a line of reference, means for resolving wind velocity into its component across said reference line, a pair of vibrating systems having the same periods of vibration, means responsive to one of the resolved components of wind velocity and coacting with both said vibrating systems to simultaneously modify the periods of vibration thereof, means responsive to said modification in vibratory period to restore said vibrating systems to the same periods of vibration, and means controlled by said restoring means to give an indication of a measure of the velocity of said component.

2. In an instrument for measuring the magnitude of the component of wind velocity at right angles to a line of reference, means for resolving wind velocity into its component across said reference line, a pair of electromechanical vibrating systems including mechanical frequency controlling elements having the same period of vibration, diaphragm means responsive to one of the resolved components of wind velocity and coacting with both said electromechanical vibrating systems to modify the periods of vibration thereof, means responsive to the difference frequency thereby produced between said vibrating systems and coacting with said controlling elements thereof to simultaneously restore said systems to the same period of vibration, and means controlled by the last named means for giving an indication of a measure of the velocity of said component.

3. In an instrument for measuring the magnitude of the component of wind velcoity at right angles to a line of reference, means for resolving wind velocity into its component across said reference line, a diaphragm responsive in displacement to the component of wind velocity across said reference line, a rockable bar, a tensioned wire anchored at a midpoint to said diaphragm and at its ends to said bar, means to cause the wire on each side of said diaphragm to vibrate independently, means to compare the frequency vibration of one portion of said wire with the frequency of vibration of the remaining portion thereof, means responsive to the last named means and coacting with said rockable bar to alter the tension in said wires and thereby the frequency of vibration thereof, and means coacting with the last named means to indicate the extent of the change in tension as a function of wind velocity.

4. In an instrument for measuring the magnitude of the component of wind velocity at right angles to a line of reference, means for resolving wind velocity into its component across said reference line, a diaphragm responsive in displacement to the component of wind velocity across said reference line, a bar rockable about its center, a wire under tension, said wire being anchored at its center to said diaphragm and at its ends to said bar, means to direct the crosswind component of resolved wind velocity upon said diaphragm, means to cause the wire at each side of said diaphragm to vibrate independently of the other at a period corresponding to the tension therein, means responsive to the frequency of vibration of each of said parts of said wire, means coacting with the last named means for comparing the frequency of vibration of each of each of said parts of said wire, means responsive to said comparing means and coacting with said rockable bar to rock the same thereby equalizing the tension in said wire, and means coacting with the last named means to indicate the degree of displacement of said rockable bar as a function of wind velocity across said reference line.

5. In an instrument for measuring the magnitude of the component of wind velocity at right angles to a line of reference, means for resolving wind velocity into its component across said reference line, a dipahragm responsive in displacement to wind pressure, means for directing the resolved component of wind across said line upon said diaphragm, a bar rockable about its center, a wire, said wire being anchored at its center to said diaphragm and at its ends to said bar, a plurality of coils each having a magnetic structure containing an air gap oriented about said wire, amplifier means, circuit means coupling said coils, said wire and said amplifiers into two electromechanical oscillators, means for comparing frequency of vibration of said electromechanical oscillators with the other and responsive in output to the algebraic sum of the frequency of vibration of each of them, motor means responsive to the output of the aforesaid comparing means and coupled to said rockable bar to rock the same to equalize the tension in said wires, indicator means coacting with the last named means to indicate the degree of displacement of said rockable bar as a function of wind component velocity, and a power source to energize said amplifiers and said motor.

EARL E. LIBMAN.
EDWARD LOHSE.

REFERENCES CITED

The following references are of record in the file of this patent:

UNITED STATES PATENTS

| Number | Name | Date |
| --- | --- | --- |
| 2,029,700 | Boykow | Feb. 4, 1936 |
| 2,050,674 | Stover | Aug. 11, 1936 |
| 2,113,528 | Reuter | Apr. 5, 1938 |
| 2,306,137 | Pabst et al. | Dec. 22, 1942 |

FOREIGN PATENTS

| Number | Country | Date |
| --- | --- | --- |
| 729,894 | Germany | Dec. 19, 1942 |